United States Patent
Van Den Berg et al.

(10) Patent No.: US 6,886,492 B2
(45) Date of Patent: May 3, 2005

(54) DEVICE FOR AUTOMATICALLY MILKING AN ANIMAL

(75) Inventors: Karel Van Den Berg, Bleskensgraaf (NL); Helena Geralda Maria Vijverberg, Maassluis (NL); Lucien Eliza Niels Voogd, Leerdam (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 10/249,980

(22) Filed: May 23, 2003

(65) Prior Publication Data

US 2003/0226510 A1 Dec. 11, 2003

(30) Foreign Application Priority Data

Jun. 6, 2002 (NL) .............................................. 1020805

(51) Int. Cl.[7] ................................................. A01J 5/01
(52) U.S. Cl. ................................ 119/14.08; 119/14.02; 119/14.15
(58) Field of Search .......................... 119/14.01, 14.02, 119/14.08, 14.14, 14.15, 14.16, 14.17

(56) References Cited

U.S. PATENT DOCUMENTS

| | | | | | |
|---|---|---|---|---|---|
| 3,566,841 | A | * | 3/1971 | Gerrish et al. ............ | 119/14.15 |
| 4,198,999 | A | * | 4/1980 | Boudreau ....................... | 137/2 |
| 4,325,028 | A | * | 4/1982 | Takahashi .................... | 324/442 |
| 4,344,385 | A | * | 8/1982 | Swanson et al. ......... | 119/14.08 |
| 4,771,007 | A | * | 9/1988 | Tippetts et al. ............. | 436/150 |
| 5,568,788 | A | * | 10/1996 | van den Berg et al. ... | 119/14.02 |
| 5,704,311 | A | * | 1/1998 | van den Berg .......... | 119/14.02 |
| 5,722,343 | A | * | 3/1998 | Aurik et al. ............. | 119/14.02 |
| 5,743,209 | A | * | 4/1998 | Bazin et al. ............. | 119/14.08 |
| 5,762,020 | A | * | 6/1998 | van der Lely ........... | 119/14.08 |
| 5,769,024 | A | * | 6/1998 | Ornerfors et al. ........ | 119/14.02 |
| 5,913,281 | A | * | 6/1999 | van den Berg .......... | 119/14.18 |
| 6,155,204 | A | * | 12/2000 | van der Lely et al. .... | 119/14.02 |
| 6,213,051 | B1 | | 4/2001 | Fransen | |
| 6,371,046 | B1 | | 4/2002 | Petterson et al. | |
| 6,578,516 | B1 | * | 6/2003 | Oosterling et al. ...... | 119/14.18 |

FOREIGN PATENT DOCUMENTS

| | | | |
|---|---|---|---|
| EP | 0055628 | * | 7/1982 |
| EP | 0551956 | * | 7/1993 |
| WO | WO 9701953 A | | 1/1997 |

* cited by examiner

Primary Examiner—Peter M. Poon
Assistant Examiner—David J Parsley
(74) Attorney, Agent, or Firm—Howrey Simon Arnold & White; Jacobus C. Rasser; David P. Swen

(57) ABSTRACT

A device for automatically milking an animal, which device is provided with a milking robot, a computer for controlling the operation of the device, a measuring device for performing measurements on milk obtained from an animal, at least two teat cups, and a common milk line for discharging milk coming from the at least two teat cups, each teat cup being connected via a teat cup line to the common milk line. The device is provided with a milk-determining element for determining the teat cup from which comes the milk present in the common milk line and for emitting a determination signal. The measuring device comprises a common sensor for performing measurements on milk obtained from an animal and for emitting a measurement signal. The common sensor is disposed in the common milk line. The computer is suitable for combining the measurement signal and the determination signal.

17 Claims, 3 Drawing Sheets

DEVICE FOR AUTOMATICALLY MILKING AN ANIMAL

BACKGROUND OF INVENTION

1. Field of the Invention

The invention relates to the field of milking and more particularly to devices and methods for automatically milking an animal.

2. Description of the Related Art

Devices are known in which a milking robot is arranged to attach teat cups to the teats of an animal. Such devices may be provided with measuring devices comprising sensors for performing measurements on milk obtained from the animal and for emitting a measurement signal. A computer may also be provided for controlling the operation of the device.

SUMMARY OF INVENTION

According to an aspect of the present invention, it is desirable to provide a device for automatically milking an animal, by means of which measurements on milk can accurately be performed in a relatively cheap manner.

For this purpose, according to the invention, a device for automatically milking an animal comprises a milking robot, a computer for controlling the operation of the device, at least two teat cups, a common milk line for discharging milk coming from the at least two teat cups, each teat cup being connected via a teat cup line to the common milk line, a milk-determining element for determining the teat cup from which comes the milk present in the common milk line and for emitting a determination signal, a measuring device comprising a common sensor for performing measurements on milk obtained from the animal and for emitting a measurement signal, the common sensor being disposed in the common milk line and a computer for controlling the operation of the device, the computer combining the measurement signal and the determination signal to determine the teat cup from which the milk measured originates. With the aid of the milk-determining element, which may be a relatively cheap element, the computer is capable of determining from which teat cup comes the milk that is measured by the sensor. Thus the measured values from the sensor can be stored and processed per teat cup, if desired.

If a valve that is controlled by the milk-determining element is disposed in each teat cup line between the milk-determining element and the common milk line, it is possible to open the valve when a particular buffer quantity of milk required for performing the measurement is present, so that the buffer quantity can be measured by the sensor.

For the purpose of guiding air to beyond said one sensor, in an embodiment of a device according to the invention each teat cup line may be provided with a bypass line, the bypass line having a first end that is connected to the teat cup line in a position between the teat cup and the milk-determining element and a second end that is connected to the common milk line in a position downstream relative to said one sensor.

In an advantageous embodiment of a device according to the invention, said one sensor may be a spectrum analyser, an infrared meter, a proximity infrared meter or a conductivity meter.

According to a further aspect of the present invention there is also provided a method of controlling the automatic milking of an animal using an automatic milking device. The method comprises: attaching at least two teat cups to at least two teats of the animal using a milking robot, each teat cup being connected via a teat cup line to a common milk line; applying a vacuum to the teat cups to cause milk to be withdrawn from the teats and to be supplied to the respective teat cup lines and to the common milk line; determining the teat cup from which milk present in the common milk line has come and emitting a determination signal; performing measurements on the milk present in a sensing region of the common milk line and emitting a measurement signal; and controlling the operation of the device on the basis of the measurement signal and the determination signal.

BRIEF DESCRIPTION OF DRAWINGS

An embodiment of the invention will now be explained in further detail by way of example only with reference to the accompanying figures, in which.

DETAILED DESCRIPTION

Figure 1:
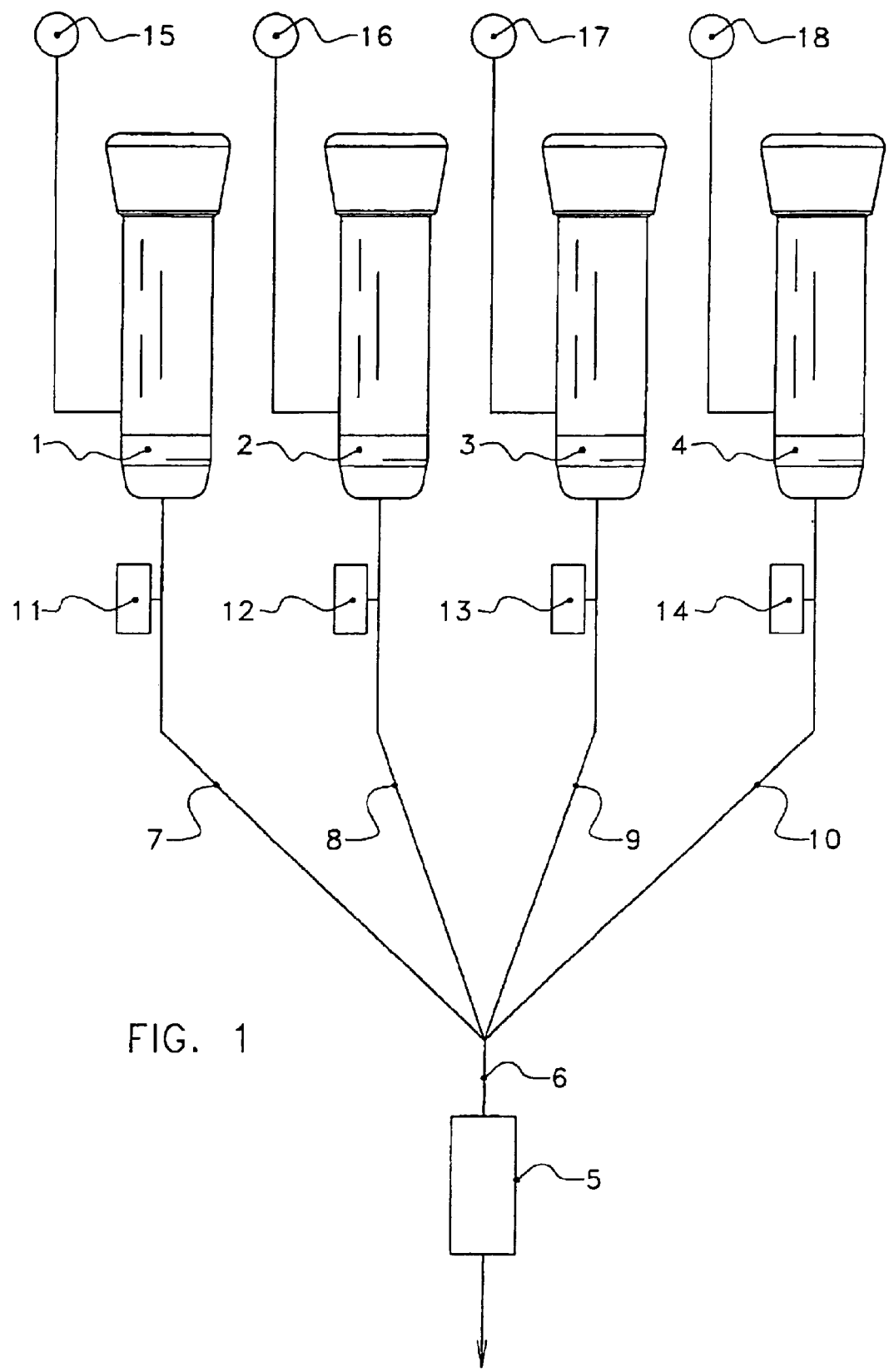
FIG. 1 shows diagrammatically a first embodiment of a device according to the invention.

FIG. 1 shows diagrammatically a first embodiment of a device for automatically milking an animal. The device may be an automatic milking device of the type known from U.S. Pat. No. 6,213,051, the contents of which are hereby incorporated by reference in their entirety. The device is provided with a milking robot (not shown) that is known per se for connecting at least two teat cups, in the embodiment shown four teat cups 1, 2, 3, 4, to respective teats of the animal. Such a milking robot comprises customarily a computer (not shown) for controlling the operation of the milking robot and the relevant peripheral equipment, and for receiving measurement data obtained by measurements performed on milk obtained from an animal.

The device is provided with a common sensor 5, in particular a spectrum analyser, by means of which, on the basis of the spectrum obtained, inter alia measurements on the components of the milk obtained can accurately be performed. Said common sensor 5 performs measurements on the milk obtained from all the teat cups 1, 2, 3, 4 and is connected to the computer via a non-shown line for emitting a measurement signal to the computer. However, the invention is not limited to one sole common sensor that performs measurements on milk obtained from all the teat cups, but may be applied to a common sensor that performs measurements on milk obtained from at least two different teat cups. The common sensor 5 is disposed in a common milk line 6, and each teat cup 1, 2, 3, 4 is connected to the common milk line 6 via a respective teat cup line 7, 8, 9, 10. In each teat cup line 7, 8, 9, 10 there is provided a milk-determining element 11, 12, 13, 14 for determining the teat cup from which comes the milk that is present in the common milk line and for emitting a determination signal to the computer. The computer combines the data from the milk-determining means and the measurement signals from the common sensor 5, so that measured values for the milk obtained from the respective teat cups, or the respective quarter of the animal, can be obtained. The milk-determining means are thus used for determining the teat cup from which comes the milk that is measured by the common sensor. By 'a sensor or a milk-determining element disposed in a line' is meant that the sensor or the milk-determining element is positioned relative to the line in such a way that a measurement on the milk in the line can be performed. Accordingly, only one sensor 5 is required for measuring the milk obtained from all the teat cups.

Figure 2:
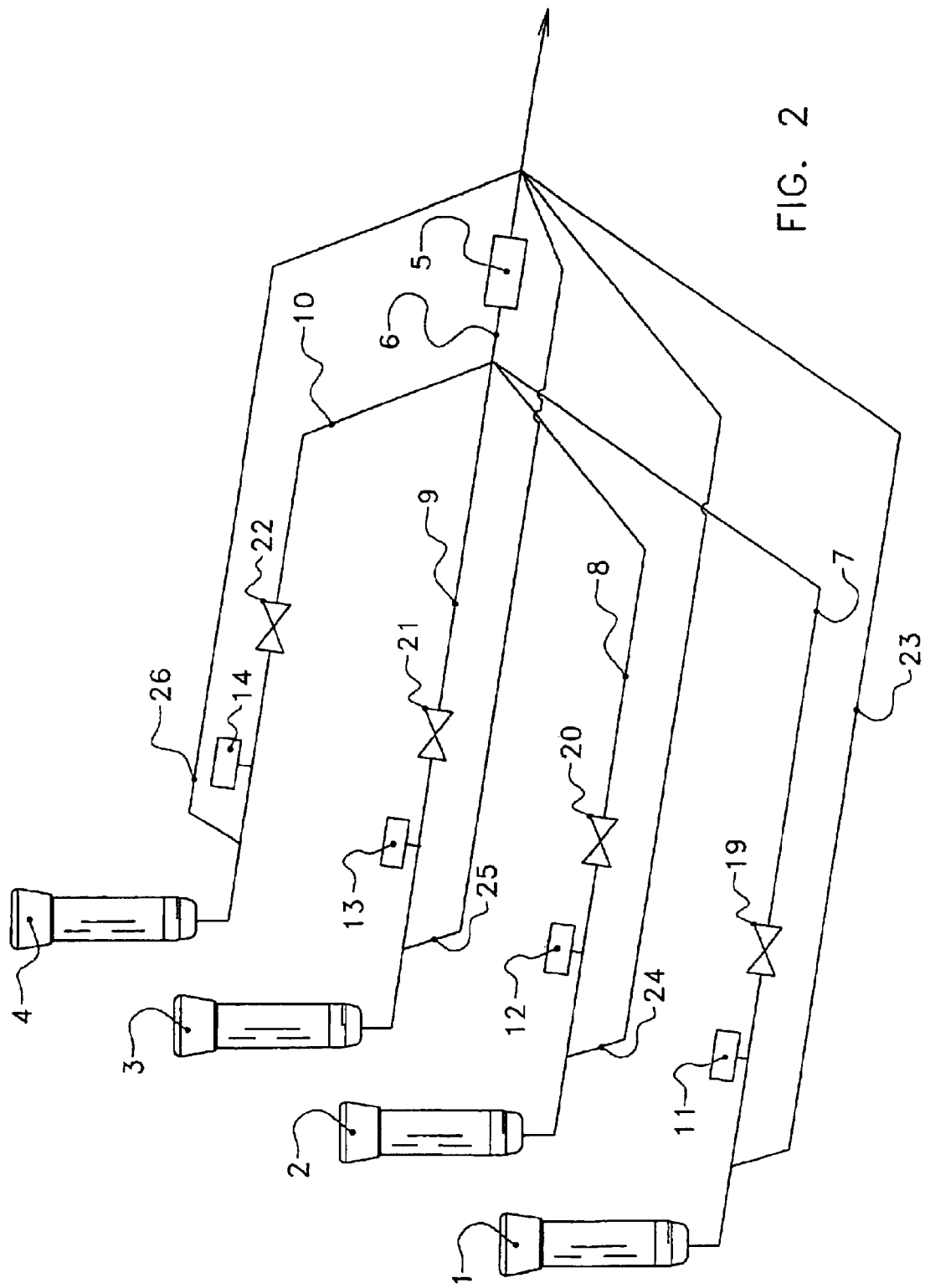
FIG. 2 shows diagrammatically a second embodiment of a device according to the invention.

FIG. 2 shows diagrammatically a second embodiment of a device for performing measurements on milk obtained from an animal. In this embodiment a controlled valve 19, 20, 21, 22 is disposed in each teat cup line 7, 8, 9, 10 between the milk-determining element 11, 12, 13, 14 and the common milk line 6. In this manner, when a controlled valve is in its closed position, a buffer quantity of milk can be collected. When the relevant milk-determining element detects a particular, for example a predetermined buffer quantity, it is possible for said milk-determining element to control the relevant valve in such a way that it is opened (and to control the valves in the other teat cup lines in such a way that they remain closed) thus enabling the sensor 5 to perform measurements on the relevant milk.

In order to prevent air present in the milk from disturbing the measurements, each teat cup line 7, 8, 9, 10 is provided with a bypass line 23, 24, 25, 26. Each bypass line has a first end that is connected to the respective teat cup line in a position between the teat cup and the milk-determining element and a second end that is connected to the common milk line in a position downstream relative to the common sensor.

Figure 3:
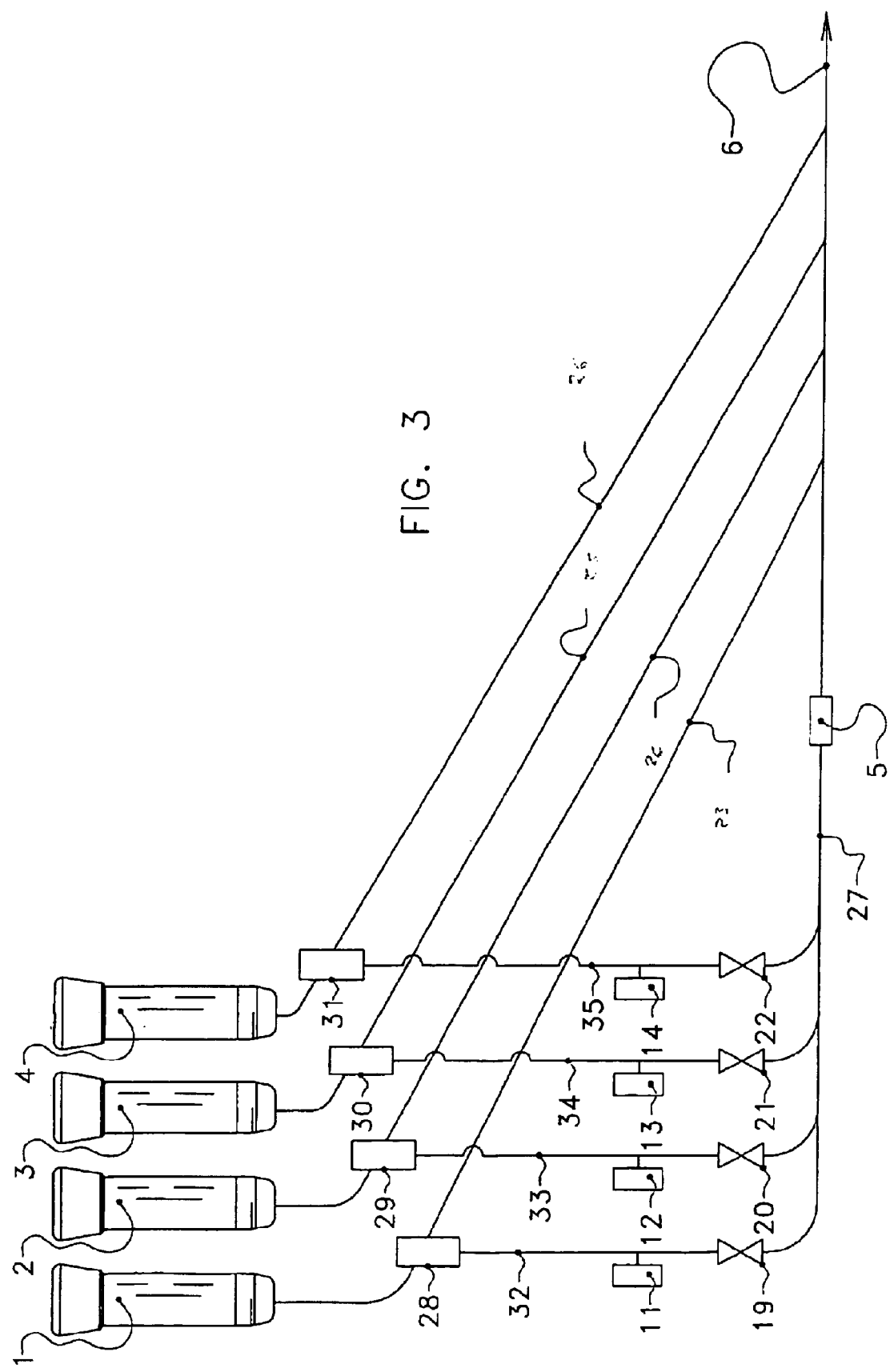
FIG. 3 shows diagrammatically a third embodiment of a device according to the invention.

FIG. 3 shows diagrammatically a third embodiment of a device for performing measurements on milk obtained from an animal. In this embodiment the device is provided with a common milk line 6, each teat cup 1, 2, 3, 4 being connected, via a teat cup line 32, 33, 34, 35, to the common milk line 6 in which the common sensor 5 is disposed. In each teat cup line 32, 33, 34, 35 there is further disposed a controlled valve 19, 20, 21, 22, as well as a milk-determining element 11, 12, 13, 14 for detecting milk upstream relative to the controlled valve 19, 20, 21, 22. In this embodiment the portion of each teat cup line that is located upstream relative to the valve extends substantially vertically, so that there is created above a closed valve a milk column as buffer quantity. In order to prevent air present in the milk from disturbing the measurements, each teat cup line 32, 33, 34, 35 is provided with a bypass line 23, 24, 25, 26. Each bypass line has a first end that is connected to the respective teat cup line in a position between the teat cup and the milk-determining element and a second end that is connected to the common milk line in a position downstream relative to the common sensor.

It will be obvious that also other embodiments for obtaining a buffer may be applied within the scope of the invention. It is possible for example to use a buffer reservoir 28, 29, 30, 31 as connection between teat cup line and bypass line. It is then also possible to integrate the controlled valve and the milk-determining element into the buffer reservoir. It is also possible to employ an arrangement of buffers of the type known from co-pending U.S. patent application Ser. No. 10/249,955 by the present inventor entitled "A device for automatically milking an animal" and filed 22 May 2003, the contents of which are hereby incorporated by reference in their entirety. It will further be obvious that, although the invention has been described with reference to a spectrum analyser as only sensor, the invention may also be applied if said one sensor is an infrared meter, a proximity infrared meter, a conductivity meter or the like.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for automatically milking an animal, comprising:
    a milking robot;
    at least two teat cups;
    a common milk line for discharging milk coming from the teat cups, each teat cup being connected via a teat cup line to the common milk line;
    a milk-determining element for determining the teat cup from which milk present in the common milk line has come and for emitting a determination signal;
    a measuring device comprising a common sensor for performing measurements on milk obtained from the animal and for emitting a measurement signal, the common sensor being disposed in the common milk line;
    a valve disposed in each teat cup line between the milk-determining element and the common milk line selectively supplying milk from the individual teat cup lines to the common milk line wherein the valve is directly controlled by the milk-determining element; and
    a computer for receiving the measurement signal and the determination signal to determine from which teat cup comes the milk that is measured by the common sensor and controlling the operation of the device.

2. The device as claimed in claim 1, wherein each teat cup line is provided with a bypass line, the bypass line having a first end connected to the teat cup line in a position between the teat cup and the milk-determining element and a second end connected to the common milk line in a position downstream relative to the common sensor.

3. The device as claimed in claim 1, wherein the common sensor is a spectrum analyser.

4. The device as claimed in claim 1, wherein the common sensor is an infrared meter.

5. The device as claimed in claim 1, wherein the common sensor is a proximity infrared meter.

6. The device as claimed in claim 1, wherein the common sensor is a conductivity meter.

7. The device as claimed in claim 2, wherein the common sensor is a spectrum analyser.

8. The device as claimed in claim 2, wherein the common sensor is an infrared meter.

9. The device as claimed in claim 2, wherein the common sensor is a proximity infrared meter.

10. The device as claimed in claim 2, wherein the common sensor is a conductivity meter.

11. The device as claimed in claim 2, further comprising a buffer reservoir provided in each teat cup line between the respective teat cup and valve.

12. The device as claimed in claim 11, wherein the milk determining element is integrated into the buffer reservoir.

13. A method of controlling the automatic milking of an animal using an automatic milking device, the method comprising:
    attaching at least two teat cups to at least two teats of the animal using a milking robot, each teat cup being connected via a teat cup line to a common milk line;
    applying a vacuum to the teat cups to cause milk to be withdrawn from the teats and to be supplied to the respective teat cup lines and to the common milk line;
    determining, using a milk-determining element, the teat cup from which milk present in the common milk line has come and emitting a determination signal;

performing measurements on the milk present in a sensing region of the common milk line and emitting a measurement signal; and controlling the operation of the device on the basis of the measurement signal and the determination signal;

wherein a valve is disposed in each teat cup line and is directly controlled by the milk-determining element to selectively supply milk from the individual teat cup lines to the sensing region of the common milk line.

14. The method as claimed in claim 13, wherein each teat cup line is provided with a bypass line, the bypass line having a first end connected to the teat cup line and a second end connected to the common milk line downstream of the sensing region, and the milk from a teat cup line which is not selectively supplied to the sensing region, is caused to flow through its respective bypass line to bypass the sensing region.

15. A device for automatically milking an animal, comprising:

a milking robot;

at least two teat cups;

a common milk line for discharging milk coming from the teat cups, each teat cup being connected via a teat cup line to the common milk line;

a milk-determining element for determining the teat cup from which milk present in the common milk line has come and for emitting a determination signal;

a measuring device comprising a common sensor for performing measurements on milk obtained from the animal and for emitting a measurement signal, the common sensor being disposed in the common milk line; and a computer for receiving the measurement signal and the determination signal to determine from which teat cup comes the milk that is measured by the common sensor and controlling the operation of the device, wherein a valve controlled by the milk-determining element is disposed in each teat cup line between the milk-determining element and the common milk line and wherein each teat cup line is provided with a bypass line, the bypass line having a first end connected to the teat cup line in a position between the teat cup and the milk-determining element and a second end connected to the common milk line in a position downstream relative to the common sensor.

16. The device as claimed in claim 15, wherein the common sensor is a spectrum analyser.

17. A method of controlling the automatic milking of an animal using an automatic milking device, the method comprising:

attaching at least two teat cups to at least two teats of the animal using a milking robot, each teat cup being connected via a teat cup line to a common milk line;

applying a vacuum to the teat cups to cause milk to be withdrawn from the teats and to be supplied to the respective teat cup lines and to the common milk line;

determining the teat cup from which milk present in the common milk line has come and emitting a determination signal;

performing measurements on the milk present in a sensing region of the common milk line and emitting a measurement signal; and controlling the operation of the device on the basis of the measurement signal and the determination signal, wherein the milk is selectively supplied from individual teat cup lines to the sensing region of the common milk line and wherein each teat cup line is provided with a bypass line, the bypass line having a first end connected to the teat cup line and a second end connected to the common milk line downstream of the sensing region, and the milk from a teat cup line which is not selectively supplied to the sensing region, is caused to flow through its respective bypass line to bypass the sensing region.

* * * * *